Feb. 27, 1962     D. W. ADAMS     3,023,408
TRI-DIMENSIONAL RADAR
Filed Jan. 8, 1959
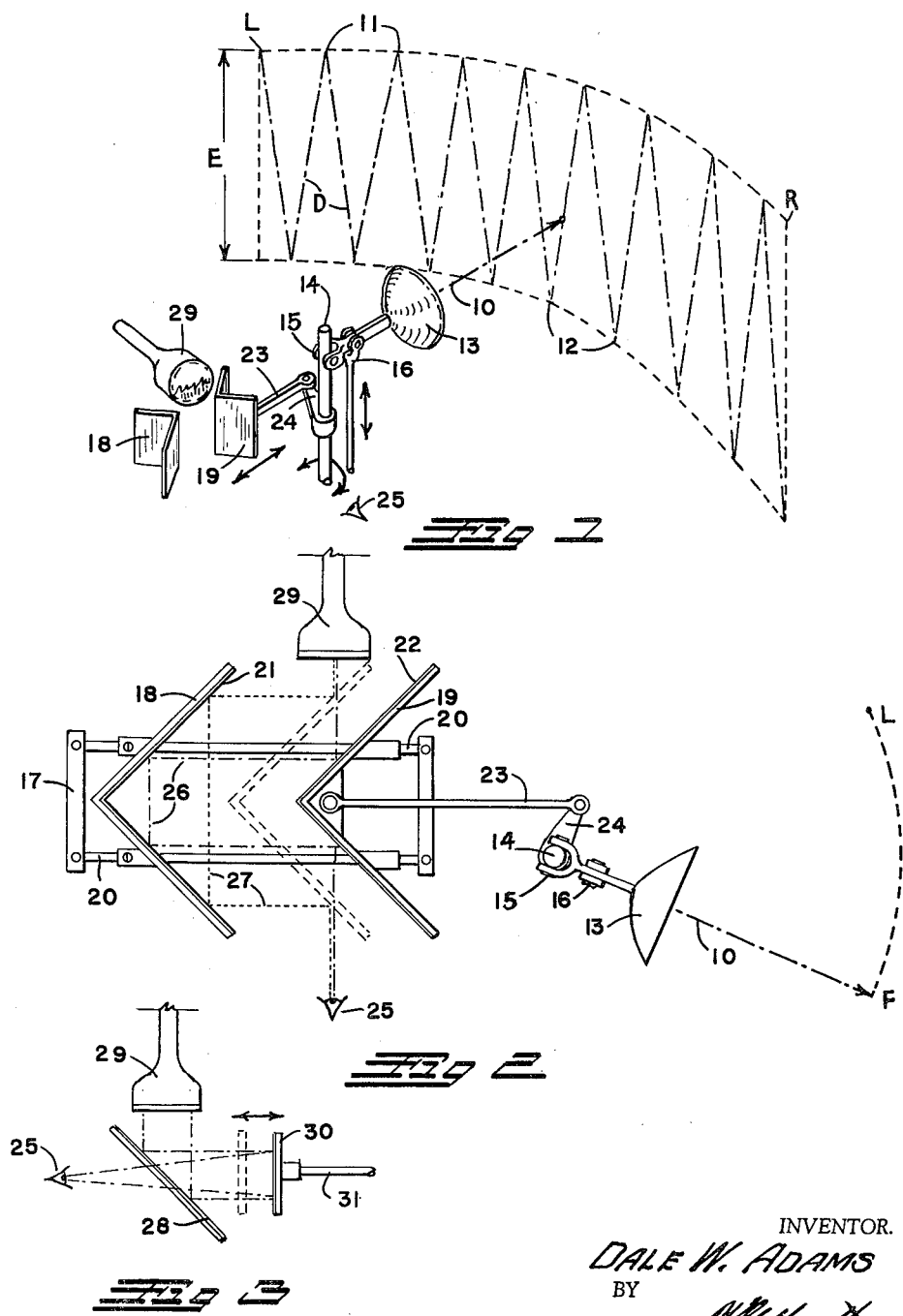
INVENTOR.
DALE W. ADAMS
BY
ATTORNEY

3,023,408
TRI-DIMENSIONAL RADAR
Dale W. Adams, Aurora, Colo.
(1040 Lafayette St., Denver, Colo.)
Filed Jan. 8, 1959, Ser. No. 785,760
1 Claim. (Cl. 343—7.9)

This invention relates to a radar system of the scanning type and more particularly to means for producing a three dimensional radar display. Present radar systems employing a simple scan can only produce a display in two dimensions, that is, it will indicate the range of a target and only one of its angular coordinates, such as, either the azimuth or the elevation. Complex scanners have been designed to indicate the location of a target in space in three dimensions by giving the range, the two angular coordinates, azimuth and elevation. Conventional systems of the latter type, however, employ two displays, either on separate cathode ray tubes or both on the same tube, one display presenting azimuth and range and the other presenting elevation and range. The latter systems require two antennae and require the successive viewing of two displays in order to formulate the desired three dimensional picture.

The principal object of this invention is to provide means for producing a radar video presentation in which all three dimensions of the subject target, to wit, range, azimuth and elevation, will be presented instantaneously and simultaneously on a single display from a single antenna so that the azimuth, elevation and range of the target will be instantly and continuously readable by viewing a single replica thereof on the face of the cathode ray tube (CRT).

Another object of the invention is to provide a three dimensional radar display upon a single cathode ray face in which azimuth angle marks, elevation angle marks or height marks, and range marks can be introduced with the video picture so that these markings will also appear in three dimensions on the screen simultaneously with the picture so that the picture may be viewed from any angle and an instant reading of the exact position of the target obtained without dislocation in parallax.

Other objects and advantages reside in the invention which will become more apparent from the following description in which reference is had to the accompanying drawing which forms a part hereof.

In the drawing:

FIG. 1 is a diagrammatic perspective representation of the principle of the improved three dimensional radar;

FIG. 2 is a diagrammatic plan view of a reciprocating mirror device employed in the invention; and FIG. 3 is a similar diagrammatic plan view of an alternate form of a reciprocating mirror device which could be employed in this invention.

Briefly, the invention comprises causing a single antenna to repeatedly scan both vertically and horizontally in a uniform pattern through the entire area to be viewed so as to produce a two dimensional display and simultaneously and synchronously varying the distance between the eye of the observer and the cathode ray tube, hereinafter referred to as the CRT 29 to provide an indication of the third dimension.

Thus, the invention provides three movements of the cathode-ray tube spot producing the radar display: (1) a vertical movement; (2) a horizontal transverse movement; and (3) an apparent horizontal axial movement of the display to and from the observer. Each movement can be compared with suitable indices to give a dimensional indication. For instance, the vertical movement may be used to determine range and elevation; and the apparent axial movement to determine azimuth.

A scanning pattern is employed for carrying out the objects of this invention by arranging a single reflector antenna so that its beam, indicated at 10, will simultaneously scan both vertically and horizontally on a sharp "zig-zag" pattern, as shown in FIG. 1, as it sweeps across the field of view. A pulse transmitter is used. The pattern defines a series of uniformly-spaced peak points 11 and a similar series of uniformly-spaced base points 12. The vertical distance between the peak points 11 and the base points 12 is greater than the horizontal distance between adjacent base points. Therefore, since the beam 10 is traveling at a uniform linear rate, it will pass through azimuth, from "L" to "R" in FIG. 1, at a slower rate than through elevation, indicated at "E," as it follows the "zig-zag" pattern. When the beam reaches the extreme right of the area being scanned, indicated by "R," the antenna beam reverses direction and retraces the pattern in reverse to the extreme left, indicated at "L," then repeats the cycle.

The vertical movement of the antenna beam gives information in two dimensions, such as range and elevation, in the normal manner and the azimuth movement of the antenna beam means is employed in this invention for causing the cathode-ray tube display to apparently move toward and away from the observer to provide the third dimension, for instance, azimuth.

For the purposes of description, an antenna 13 will be described as being physically oscillated to direct its beam 10 in the desired pattern using the pulse type transmitter. It is to be understood that the beam 10 could be deflected in the preset pattern by any of the well known beam deflection systems. As illustrated, the reflector antenna 13 is hingedly mounted, as indicated at 15, on a rotatable vertical mast 14 so that it may be oscillated in a vertical arc by any suitable connecting mechanism, as indicated at 16, while it is swung back and forth about the axis of the mast so as to follow the "zig-zag" pattern across the field of observation between the extremes "L" and "R," as indicated in broken line in FIG. 1.

Any suitable means may be provided for giving the to and from effect of the screen display. As illustrated, a guide frame 17 is mounted before the face of the cathode-ray tube 29. The frame supports a V-shaped fixed mirror 18 and a V-shaped movable mirror 19, the latter being slidably mounted on suitable guide tracks 20 in the frame 17 so that it will accurately approach and depart from the fixed mirror 18. The two sides of each mirror extend at 90° to each other and at 45° to the axis of movement of the movable mirror 19. The fixed mirror 18 is provided with internal reflecting surfaces 21 and the movable mirror 19 is provided with external reflecting surfaces 22 which face the surfaces 21 in parallel relation to the latter.

The movable mirror 19 is connected to the mast 14 in any suitable manner, such as by means of a connecting rod 23 and crank 24, so that when the antenna moves toward the position "R" the mirror 19 will move away from the mirror 18 and when the antenna 13 moves toward the position "L" the mirror 19 will approach the mirror 18. The eye of the observer, indicated at 25, is positioned in approximate alignment with the axis of the cathode-ray tube and the frame 17 is positioned so that direct view of the face of the cathode-ray tube is obscured by the mirror 19 when the latter is in the withdrawn or "R" position of FIG. 2.

It can be readily seen from the above that when the antenna 13 is in the "R" position the line of sight, indicated by the dash-dot line 26, is longer than when the antenna is in the "L" position, as indicated by the dotted line 27. Therefore, the display appears to move regularly toward and away from the observer corresponding to the azimuth sweep of the antenna and this apparent movement with suitable index scales can be used to read the third dimension, in this case the azimuth, of the target.

A second means for obtaining this effect is diagrammed in FIG. 3 wherein a semi-transparent fixed mirror 28 is positioned forwardly of and at an angle of 45° to the axis of the cathode-ray tube so as to partially reflect the picture from the face of the cathode-ray tube at 90° to the side into a flat plane movable mirror 30. The movable mirror 30 is connected to the antenna by means of a suitable connection 31 similarly to the movable mirror 19 previously described. The picture is viewed through the fixed mirror from a point in alignment with the axis of travel of the movable mirror 30.

The antenna beam 10 sweeps the full height and width of the pattern from "L" to "R" and the movable mirrors complete a directional movement in an interval sufficiently short to prevent "flicker" between the displays at "L" and "R." A picture of the target area is completed at each of the diagonal sweeps, indicated at "D." These successive pictures follow each other to give a depth perception on the eyes of the observer.

While this apparent forward and back movement has for the purpose of description been described as mechanically obtained from a mechanically moved scanning beam, the same results could be obtained by electrically moving the movable mirrors in synchronism with the horizontal sweep circuits of an electrically oscillated scanning beam.

While, for the purpose of description, the invention has been described with the dimension L—R extending horizontally and the dimension E extending vertically it is to be understood that the entire mechanism of FIGS. 1 and 2 could be positioned at any angle from the vertical. For instance, the mechanisms could be positioned at 90° from that illustrated so that dimension L—R would extend vertically and the dimension E would extend horizontally.

While a specific form of the improvement has been described and illustrated herein, it is to be understood that the same may be varied within the scope of the appended claims, without departing from the spirit of the invention.

Having thus described the invention what is claimed and desired secured by Letters Patent is:

In a tri-dimensional radar system, a rockable reflector antenna; rocking means for simultaneously rocking said antenna in altitude and azimuth, so that the transmitted beam of said antenna scans a desired field of search with a zig-zag pattern; a cathode-ray tube having a screen and connected to said antenna; optical mirror means displaceable in a path substantially perpendicular to a line which is perpendicular to said screen, which latter said line is the normal line of viewing said screen, control means actuatable by said rocking means and adapted to linearly displace said optical mirror means in synchronism with the rocking of said antenna to give the observer a third dimension in viewing the display on said screen, said optical mirror means comprising two plane mirrors mutually perpendicular and symmetrically mounted with relation to the path of displacement of said optical mirror means; and a pair of fixed plane mirrors mounted respectively parallel to the said two plane mirrors of said optical means and symmetrically with relation to the path of the displacement of said mirror means, said optical means being mounted so that it will be successively displaced into and out of the normal line of viewing of said screen.

References Cited in the file of this patent
UNITED STATES PATENTS

| | | |
|---|---|---|
| 2,524,987 | Mesa | Oct. 10, 1950 |
| 2,837,735 | Wolff | June 3, 1958 |
| 2,845,622 | Gamble | July 29, 1958 |